United States Patent
Ly et al.

(10) Patent No.: US 12,028,805 B2
(45) Date of Patent: Jul. 2, 2024

(54) WAKE UP SIGNAL FOR BASE STATION

(71) Applicant: QUALCOMM Incorporated, San Diego, CA (US)

(72) Inventors: Hung Dinh Ly, San Diego, CA (US); Krishna Kiran Mukkavilli, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 17/364,466

(22) Filed: Jun. 30, 2021

(65) Prior Publication Data

US 2023/0007581 A1 Jan. 5, 2023

(51) Int. Cl.
- *H04W 52/02* (2009.01)
- *H04L 27/26* (2006.01)
- *H04W 56/00* (2009.01)
- *H04W 74/0833* (2024.01)

(52) U.S. Cl.
CPC ... *H04W 52/0206* (2013.01); *H04L 27/26025* (2021.01); *H04W 56/001* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2010/0061356 A1* | 3/2010 | Qvarfordt | H04J 11/0093 455/501 |
| 2013/0148558 A1 | 6/2013 | Malladi et al. | |
| 2014/0105056 A1* | 4/2014 | Li | H04W 52/0203 370/252 |
| 2016/0360480 A1* | 12/2016 | Hunukumbure | H04W 52/0206 |
| 2020/0099499 A1* | 3/2020 | Yeo | H04L 1/0009 |
| 2021/0051707 A1* | 2/2021 | Rastegardoost | H04B 17/318 |
| 2023/0007702 A1* | 1/2023 | Park | H04L 5/0094 |
| 2023/0189139 A1* | 6/2023 | Priyanto | H04W 52/0235 370/311 |

FOREIGN PATENT DOCUMENTS

| | | | | |
|---|---|---|---|---|
| EP | 2941063 A1 | 11/2015 | | |
| EP | 2993945 A1 * | 3/2016 | ........ | H04W 52/0206 |
| EP | 3313010 A1 | 4/2018 | | |
| WO | WO-2014056174 A1 | 4/2014 | | |

OTHER PUBLICATIONS

International Search Report and Written Opinion—PCT/US2022/072898—ISA/EPO—dated Oct. 11, 2022.

* cited by examiner

*Primary Examiner* — Noel R Beharry
*Assistant Examiner* — Angelie T Ngo
(74) *Attorney, Agent, or Firm* — Harrity & Harrity, LLP (57) ABSTRACT

Various aspects of the present disclosure generally relate to wireless communication. In some aspects, a user equipment (UE) may transmit a wake up signal (WUS) to a base station in a WUS occasion that is configured for the WUS. The UE may transmit a communication to the base station after transmitting the WUS. Numerous other aspects are described.

28 Claims, 7 Drawing Sheets

WAKE UP SIGNAL FOR BASE STATION

FIELD OF THE DISCLOSURE

Aspects of the present disclosure generally relate to wireless communication and to techniques and apparatuses for transmitting a wake up signal to a base station.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting a wake up signal (WUS) to a base station in a WUS occasion that is configured for the WUS. The method may include transmitting a communication to the base station after transmitting the WUS.

Some aspects described herein relate to a method of wireless communication performed by a base station. The method may include receiving, from a UE while in a dormant mode, a WUS in a WUS occasion that is configured for the WUS. The method may include entering an active mode from the dormant mode based at least in part on receiving the WUS. The method may include receiving a communication from the UE after receiving the WUS.

Some aspects described herein relate to a UE for wireless communication. The user equipment may include a memory and one or more processors coupled to the memory. The one or more processors may be configured to transmit a WUS to a base station in a WUS occasion that is configured for the WUS. The one or more processors may be configured to transmit a communication to the base station after transmitting the WUS.

Some aspects described herein relate to a base station for wireless communication. The base station may include a memory and one or more processors coupled to the memory. The one or more processors may be configured to receive, from a UE while in a dormant mode, a WUS in a WUS occasion that is configured for the WUS. The one or more processors may be configured to enter an active mode from the dormant mode based at least in part on receiving the WUS. The one or more processors may be configured to receive a communication from the UE after receiving the WUS.

Some aspects described herein relate to a non-transitory computer-readable medium that stores a set of instructions for wireless communication by a UE. The set of instructions, when executed by one or more processors of the UE, may cause the UE to transmit a WUS to a base station in a WUS occasion that is configured for the WUS. The set of instructions, when executed by one or more processors of the UE, may cause the UE to transmit a communication to the base station after transmitting the WUS.

Some aspects described herein relate to a non-transitory computer-readable medium that stores a set of instructions for wireless communication by a base station. The set of instructions, when executed by one or more processors of the base station, may cause the base station to receive, from a UE while in a dormant mode, a WUS in a WUS occasion that is configured for the WUS. The set of instructions, when executed by one or more processors of the base station, may cause the base station to enter an active mode from the dormant mode based at least in part on receiving the WUS. The set of instructions, when executed by one or more processors of the base station, may cause the base station to receive a communication from the UE after receiving the WUS.

Some aspects described herein relate to an apparatus for wireless communication. The apparatus may include means for transmitting a WUS to a base station in a WUS occasion that is configured for the WUS. The apparatus may include means for transmitting a communication to the base station after transmitting the WUS.

Some aspects described herein relate to an apparatus for wireless communication. The apparatus may include means for receiving, from a UE while in a dormant mode, a WUS in a WUS occasion that is configured for the WUS. The apparatus may include means for entering an active mode from the dormant mode based at least in part on receiving the WUS. The apparatus may include means for receiving a communication from the UE after receiving the WUS.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
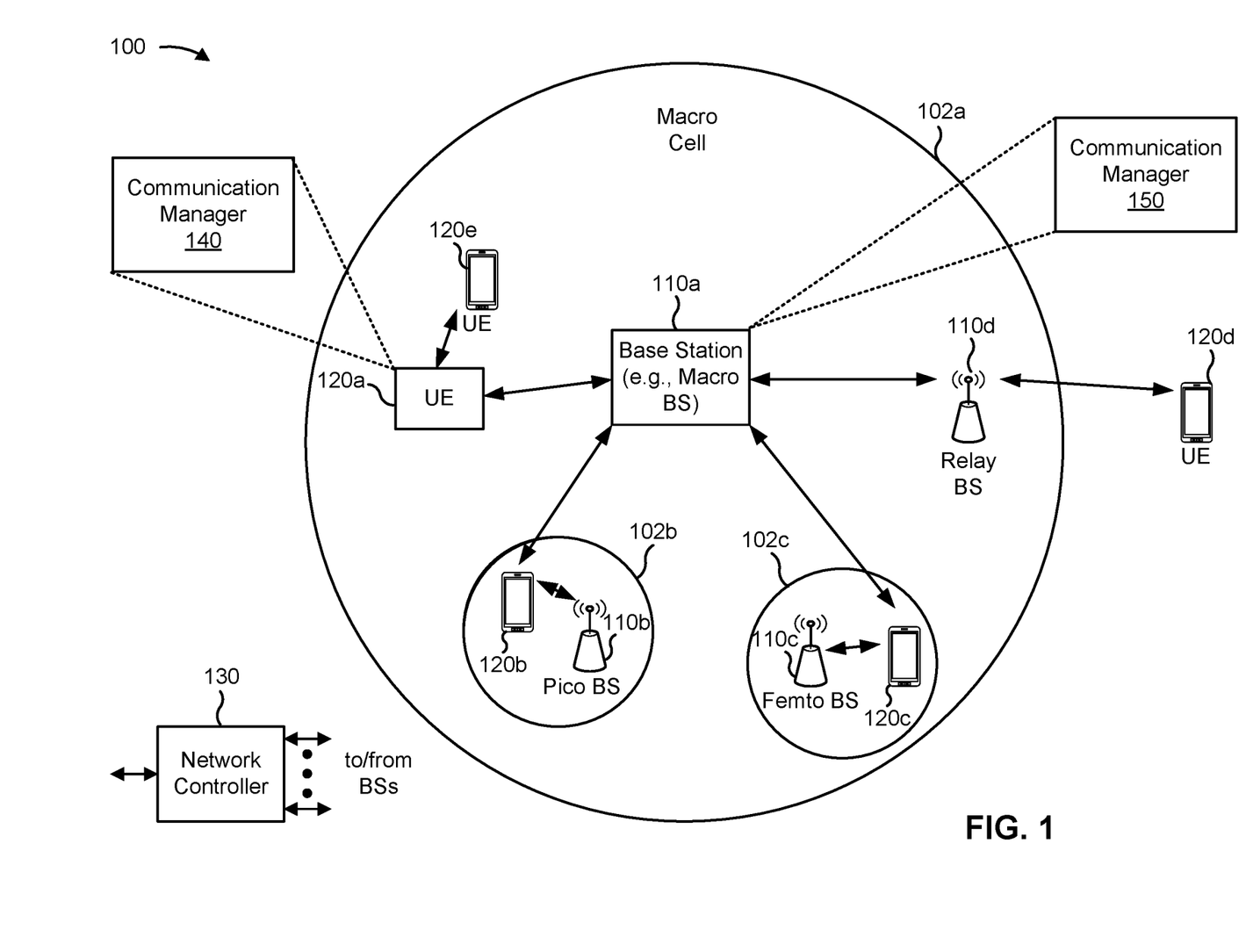
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile.

A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit a WUS to a base station in a WUS occasion that is configured for the WUS and transmit a communication to the base station after transmitting the WUS. Additionally, or alternatively, the communication manager 140 may perform one or more other operations described herein.

In some aspects, the base station 110 may include a communication manager 150. As described in more detail elsewhere herein, the communication manager 150 may receive, from a UE while in a dormant mode, a WUS in a WUS occasion that is configured for the WUS. The communication manager 150 may enter an active mode from the dormant mode based at least in part on receiving the WUS and receive a communication from the UE after receiving the WUS. Additionally, or alternatively, the communication manager 150 may perform one or more other operations described herein.

As indicated above, FIG. 1 is provided as an example. Other examples may differ from what is described with regard to FIG. 1.

Figure 2:
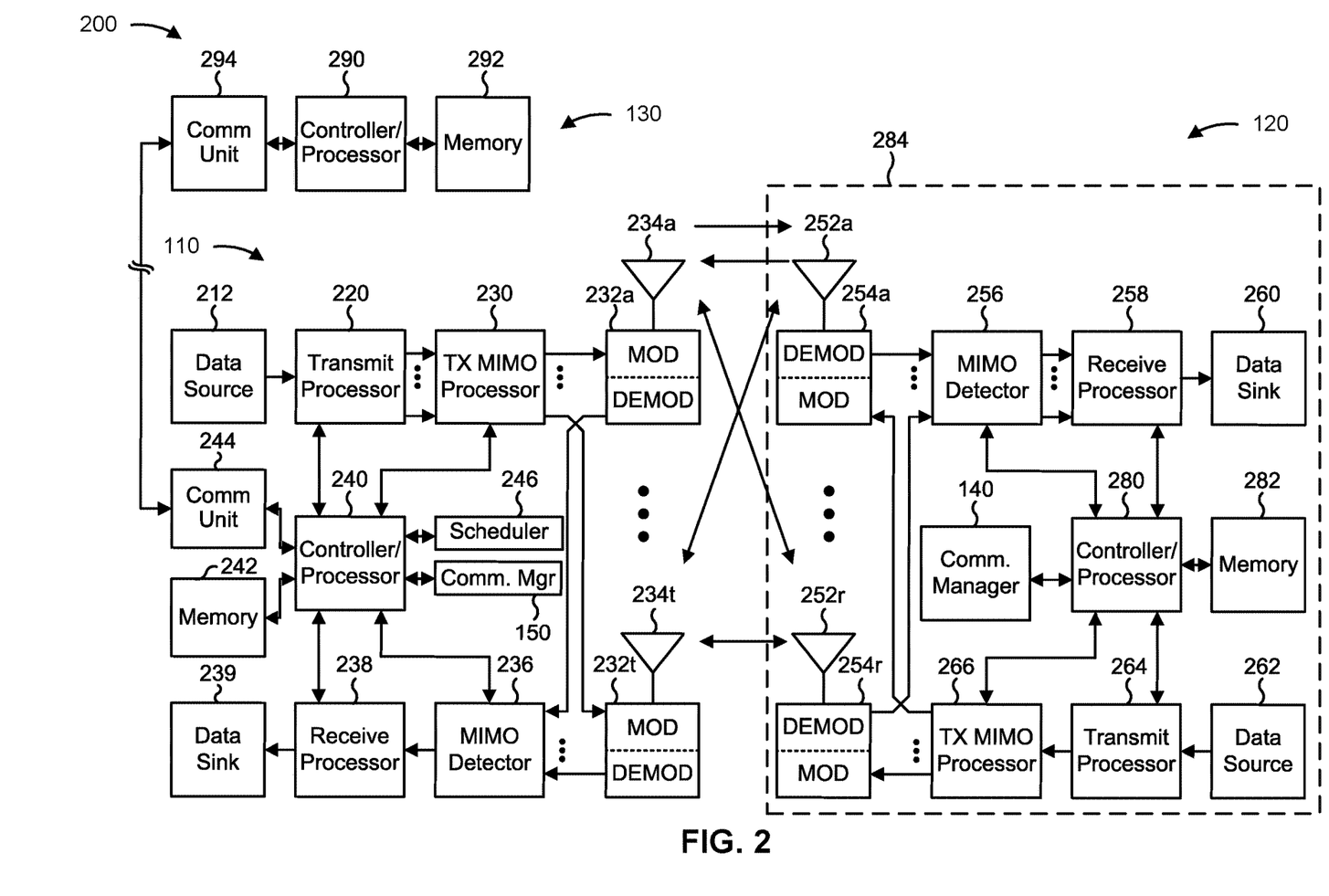
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 1-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 1-7).

The controller/processor 240 of the base station 110, the controller/processor 280 of the UE 120, and/or any other component(s) of FIG. 2 may perform one or more techniques associated with transmitting a WUS to a base station, as described in more detail elsewhere herein. For example, the controller/processor 240 of the base station 110, the controller/processor 280 of the UE 120, and/or any other component(s) of FIG. 2 may perform or direct operations of, for example, process 400 of FIG. 4, process 500 of FIG. 5, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some examples, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

In some aspects, the UE 120 includes means for transmitting a WUS to a base station in a WUS occasion that is configured for the WUS and/or means for transmitting a communication to the base station after transmitting the WUS. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for receiving, from a UE while in a dormant mode, a WUS in a WUS occasion that is configured for the WUS, means for entering an active mode from the dormant mode based at least in part on receiving the WUS, and/or means for receiving a communication from the UE after receiving the WUS. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

As indicated above, FIG. 2 is provided as an example. Other examples may differ from what is described with regard to FIG. 2.

Figure 3:
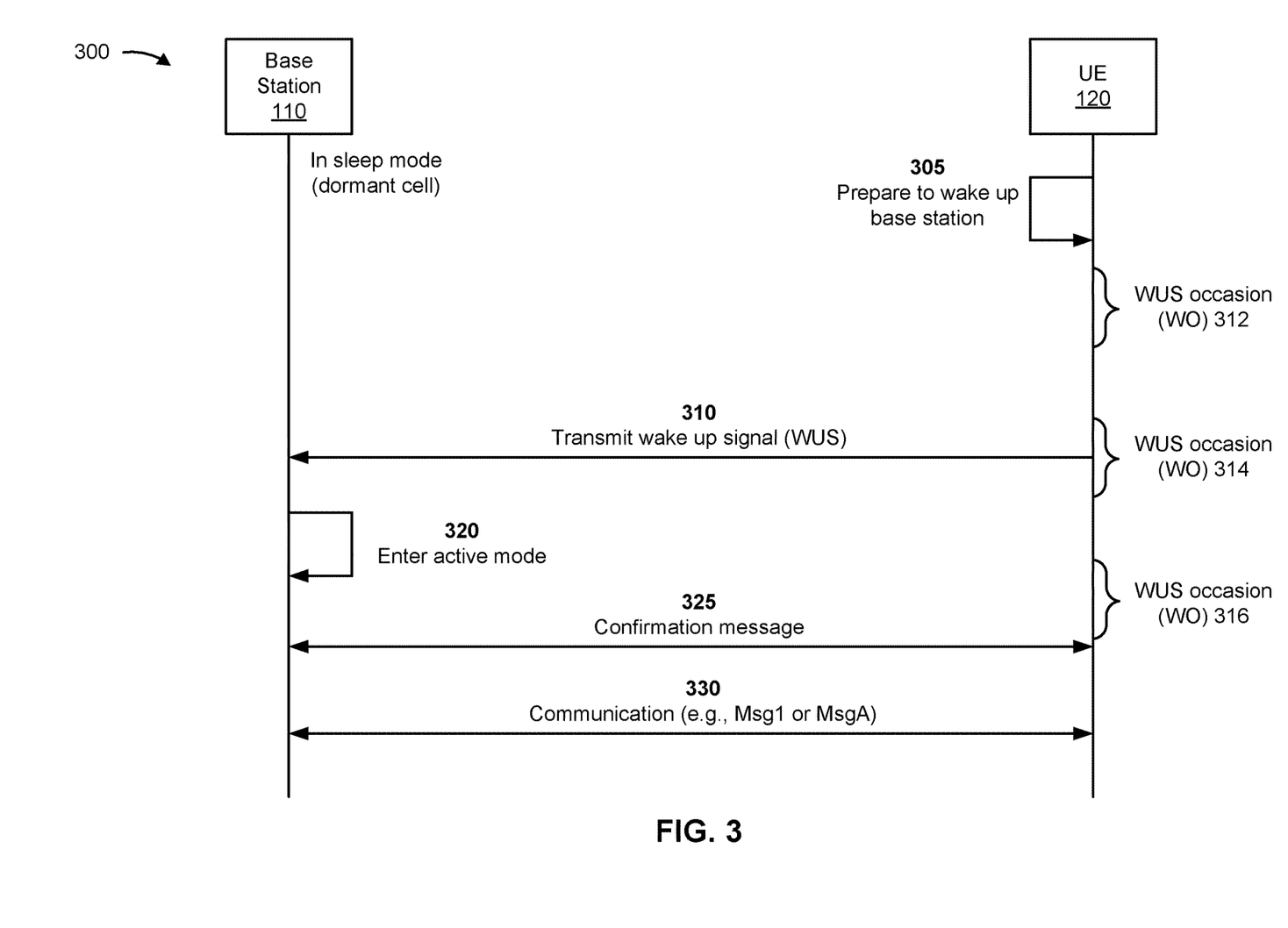
FIG. 3 is a diagram illustrating an example associated with transmitting a wake up signal to a base station, in accordance with the present disclosure.

FIG. 3 is a diagram illustrating an example 300 associated with transmitting a WUS to a base station, in accordance with the present disclosure. As shown in FIG. 3, a base station 110 and a UE 120 may communicate with one another.

An NR network may consume a great amount of electrical power, with base stations of the NR network consuming more than 20% of the power. A base station of the NR network may include multiple active array units (AAUs) to support NR communications, and the AAUs may consume 90% of the power used by the NR base station. An NR base station may consume more than 3 times the power consumed by an LTE base station, because the NR base station may operate in a higher band, over a larger bandwidth, and with more TRPs. High power consumption involves high operating expenses that reduce operator profits. Furthermore, high power consumption may impact the environment because electricity generation may increase carbon emissions.

According to various aspects described herein, the NR network may optimize power consumption as part of a green NR network. An NR base station of the NR network (e.g., base station 110), or at least a portion of the AAU of the base station 110, may sleep or wake up as needed. For example, the base station 110 may use 0-8 antenna ports, rather than 64 antenna ports, from midnight to 3 am. To further reduce power, the base station 110 may transmit synchronization signal blocks (SSBs) every 160 milliseconds (ms) rather than every 20 ms. The base station 110 conserves power in sleep mode, and the base station 110 in a sleep mode may be referred to as a "dormant cell."

In some aspects, the base station 110 may be a base station that provides a coverage cell (e.g., primary cell (PCell), or controls one or more TRPs for transmitting SSB broadcasts or connecting UEs. In some aspects, the base station 110 may be a base station that provides a capacity boosting cell or controls capacity boosting TRPs (e.g., secondary cell (SCell)). A capacity boosting base station may be in the sleep mode and may enter the active mode when needed. For example, the capacity boosting base station may be employed at stadium events, where large numbers of UEs are congregating. The capacity boosting base station may enter the sleep mode after the event ends.

The base station 110 is to be in the active mode when transmitting periodic SSB broadcasts (and other system information), when monitoring for physical RACH (PRACH) messages from UEs in PRACH occasions, and when monitoring for small data transmissions (SDTs). If there are UEs that are to enter into a connected state or transmit an SDT, the base station 110 is expected to be in the active mode. Accordingly, the base station 110 may wake up in response to a physical layer WUS from the UE 120. The WUS for the base station 110 may enable the base station 110 to sleep to reduce network power consumption and to improve network energy efficiency. The WUS may also enable predicted sleep periods for the base station 110.

In some aspects, the UE 120 may transmit the WUS as a proactive signal, such as before a first step of a 4-step RACH procedure or a 2-step RACH procedure. The first step of the 4-step RACH procedure may include the UE 120 transmitting a preamble (sometimes referred to as a random access preamble, a PRACH preamble, or a RAM preamble), which may be referred to as a message 1, msg1, MSG1, a first message, or an initial message in a four-step RACH procedure. The first step of the 2-step RACH procedure may include the UE 120 transmitting a random access message (RAM) preamble and a RAM payload. The RAM may be referred to as message A, msgA, a first message, or an initial message in a 2-step RACH procedure. The WUS may be then considered a step 0 message of a RACH procedure.

The base station 110 shown in example 300 may be in a sleep mode and may provide a dormant cell with a less active AAU. The UE 120 may prepare to connect to the base station 110. The base station 110, being in the sleep mode, has not been broadcasting SSBs or monitoring for RACH messages. The UE 120 may be aware of the dormancy of the base station 110 and, as shown by reference number 305, may prepare to wake up the base station 110.

As shown by reference number 310, the UE 120 may transmit a WUS. The UE 120 may transmit the WUS in one of multiple periodic WUS occasions (WOs), shown by WUS occasions 312, 314, and 316. WUS occasions may be dedicated for transmission and reception of a WUS. The base station 110 may reach a certain level of activity during a WUS occasion in order to monitor for the WUS. Each WUS occasion may be a time-frequency resource that occurs for a configured duration at a configured periodicity. The configured duration and period may be part of a WUS occasion numerology. The base station 110 may configure the UE 120 with a set of WUS occasions and/or with the WUS occasion numerology. The UE 120 may also obtain the WUS occasion numerology from stored configuration information (according to standardized parameters). The UE 120 may otherwise determine the WUS numerology using a rule or other information. In example 300, the UE 120 transmits the WUS in WUS occasion 314.

In some aspects, there may be an association or mapping between one or more SSBs and one or more WUS occasions. For example, in a one-to-one mapping, one SSB may be mapped to one WUS occasion. Each WUS occasion may be designated for a particular SSB. The UE 120 may select a WUS occasion for the WUS in order to wake up a particular base station or TRP that transmits the SSB. In a one-to-many mapping, one SSB may be mapped to multiple WUS occasions. In a many-to-one mapping, multiple SSBs may be mapped to one WUS occasion. There may also be multiple beams per WUS occasion and one or more SSBs may be associated with each beam in the WUS occasion.

In some aspects, the WUS may be one of various signals. The WUS may be a sounding reference signal (SRS) or a physical uplink control channel (PUCCH) communication. The WUS may be a dedicated message (e.g., dedicated PRACH message) or a new preamble of a RACH procedure. For example, the WUS may be step 0 of a RACH procedure and include a preamble that is transmitted before the preamble of a first step of the RACH procedure.

The base station 110 may detect the WUS in WUS occasion 314. As shown by reference number 320, the base station 110 may enter an active mode from the sleep mode or otherwise dormant state. The base station 110 may determine an active time, including a start time for the active mode and/or a duration of the active mode. The base station may generate a confirmation message, which may include an active time indication that specifies the start time and/or duration for the active mode.

As shown by reference number 325, the base station 110 may transmit the confirmation message. The confirmation message may be downlink control information (DCI) that schedules a paging physical downlink shared channel (PDSCH) or a paging early indication (PEI). The confirmation message may be a reference signal (e.g., a new reference signal designated for responding to a WUS) or a message on a channel that is designated for a response to a WUS. The base station 110 may broadcast the confirmation message to multiple UEs. The base station 110 may also receive confirmation messages.

The WUS may include other information. In some aspects, the WUS may include a request for PRACH message repetition. PRACH message repetition involves repeating the same PRACH message multiple times. This may help to improve reception of the PRACH message from UEs at a cell edge. The UE 120 may include the request for PRACH message repetition based at least in part on a trigger, such as an SSB RSRP satisfying a signal threshold (e.g., minimum RSRP). The trigger may also be the UE 120 satisfying a power class threshold (e.g., minimum UE power class). The UE 120 may also use other criteria (e.g., RSRQ, RSSI, signal-to-interference ratio (SIR)) to trigger the request for PRACH message repetition. In some aspects, the WUS may indicate a UE capability for supporting PRACH message repetition. Note that the request for PRACH message repetition may be an implicit indication of a UE capability of the UE 120.

In some aspects, the UE 120 may select the WUS from two or more sets of WUSs or WUS resources. For example, one WUS set may be for only waking up a base station (cell) and one WUS set may be for waking up the base station and requesting PRACH message repetition. The sets of WUSs may include WUSs that are associated with different WUS occasions. The sets of WUSs may also include different signals or different sequences for WUSs. Different WUSs may be transmitted in the same WUS occasion.

In some aspects, the UE 120 may select a transmit power for the WUS. The transmit power for the WUS may be the same or different than a transmit power for a communication (e.g., Msg1, MsgA) that follows the WUS. As shown by reference number 330, the UE 120 may transmit the communication. The transmit power for the communication may be based at least in part on the transmit power for the WUS. In some aspects, there may be a power offset between the transmit power for the communication and the transmit power for the WUS. The UE 120 may transmit the WUS and the communication based at least in part on the power offset. In some aspects, the base station 110 may also transmit communications, such as a Msg2 or a MsgB.

As indicated above, FIG. 3 is provided as an example. Other examples may differ from what is described with regard to FIG. 3.

Figure 4:
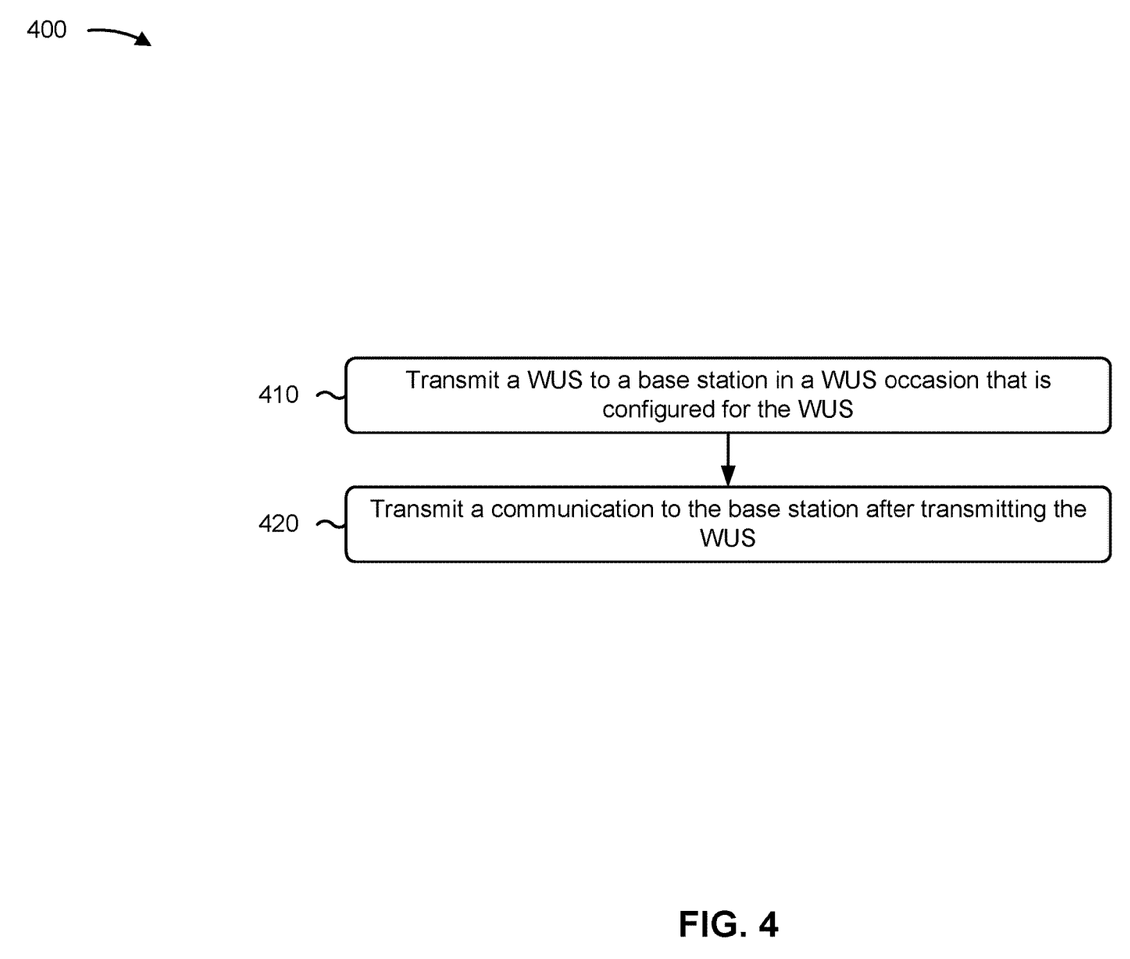
FIG. 4 is a diagram illustrating an example process performed, for example, by a UE, in accordance with the present disclosure.

FIG. 4 is a diagram illustrating an example process 400 performed, for example, by a UE, in accordance with the present disclosure. Example process 400 is an example where the UE (e.g., UE 120) performs operations associated with transmitting a WUS to a base station.

As shown in FIG. 4, in some aspects, process 400 may include transmitting a WUS to a base station in a WUS occasion that is configured for the WUS (block 410). For example, the UE (e.g., using communication manager 140 and/or transmission component 604 depicted in FIG. 6) may transmit a WUS to a base station in a WUS occasion that is configured for the WUS, as described above.

As further shown in FIG. 4, in some aspects, process 400 may include transmitting a communication to the base station after transmitting the WUS (block 420). For example, the UE (e.g., using communication manager 140 and/or transmission component 604 depicted in FIG. 6) may transmit a communication to the base station after transmitting the WUS, as described above.

Process 400 may include additional aspects, such as any single aspect or any combination of aspects described below and/or in connection with one or more other processes described elsewhere herein.

In a first aspect, the WUS occasion corresponds to an SSB.

In a second aspect, alone or in combination with the first aspect, the WUS occasion corresponds to multiple SSBs.

In a third aspect, alone or in combination with one or more of the first and second aspects, the WUS occasion is one of multiple WUS occasions that correspond to an SSB.

In a fourth aspect, alone or in combination with one or more of the first through third aspects, the WUS is a dedicated message or preamble of a RACH procedure.

In a fifth aspect, alone or in combination with one or more of the first through fourth aspects, the communication after the WUS is a Msg1 or MsgA of the RACH procedure.

In a sixth aspect, alone or in combination with one or more of the first through fifth aspects, the WUS is an SRS or a PUCCH communication.

In a seventh aspect, alone or in combination with one or more of the first through sixth aspects, process 400 includes obtaining an indication of a numerology of the WUS or of WUS occasions from the base station or from stored configuration information.

In an eighth aspect, alone or in combination with one or more of the first through seventh aspects, process 400 includes receiving a confirmation message in response to transmitting the WUS.

In a ninth aspect, alone or in combination with one or more of the first through eighth aspects, the confirmation message is DCI that schedules a paging PDSCH, a paging message carried in the PDSCH, a PEI, a reference signal, or a message on a designated channel.

In a tenth aspect, alone or in combination with one or more of the first through ninth aspects, the WUS includes a request for PRACH message repetition.

In an eleventh aspect, alone or in combination with one or more of the first through tenth aspects, the WUS includes the request for PRACH message repetition if a signal strength of a corresponding SSB satisfies a signal threshold or if a power class of the UE satisfies a power class threshold.

In a twelfth aspect, alone or in combination with one or more of the first through eleventh aspects, the WUS indicates a UE capability for supporting PRACH message repetition.

In a thirteenth aspect, alone or in combination with one or more of the first through twelfth aspects, a transmit power for the communication is based at least in part on a transmit power for the WUS.

In a fourteenth aspect, alone or in combination with one or more of the first through thirteenth aspects, the transmit power for the communication is further based at least in part on a power offset between the transmit power for the communication and the transmit power for the WUS.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
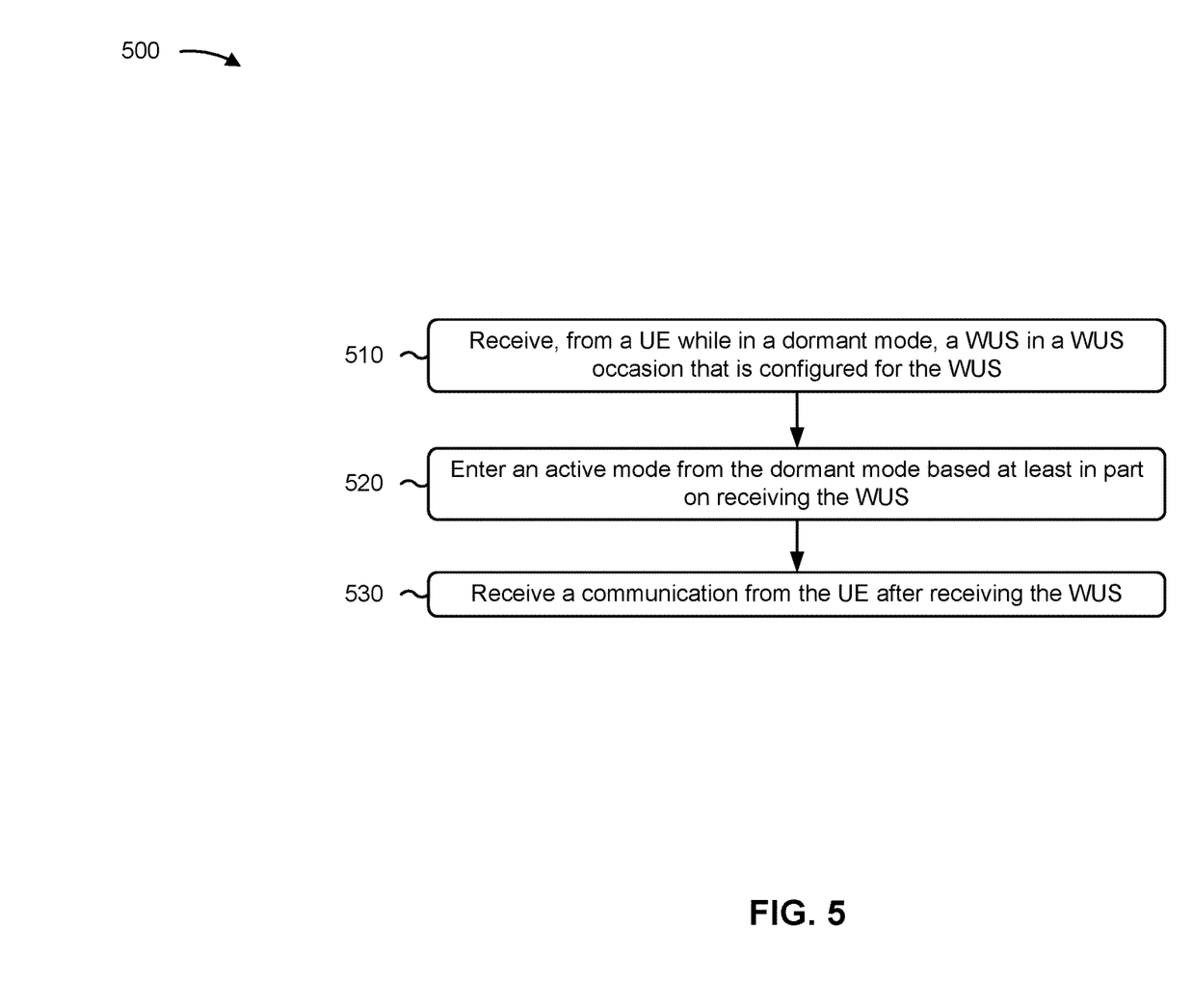
FIG. 5 is a diagram illustrating an example process performed, for example, by a base station, in accordance with the present disclosure.

FIG. 5 is a diagram illustrating an example process 500 performed, for example, by a base station, in accordance with the present disclosure. Example process 500 is an example where the base station (e.g., base station 110) performs operations associated with waking up in response to receiving a WUS from a UE.

As shown in FIG. 5, in some aspects, process 500 may include receiving, from a UE while in a dormant mode, a WUS in a WUS occasion that is configured for the WUS (block 510). For example, the base station (e.g., using communication manager 150 and/or reception component 702 depicted in FIG. 7) may receive, from a UE while in a dormant mode, a WUS in a WUS occasion that is configured for the WUS, as described above.

As further shown in FIG. 5, in some aspects, process 500 may include entering an active mode from the dormant mode based at least in part on receiving the WUS (block 520). For example, the base station (e.g., using communication manager 150 and/or switching component 708 depicted in FIG. 7) may enter an active mode from the dormant mode based at least in part on receiving the WUS, as described above.

As further shown in FIG. 5, in some aspects, process 500 may include receiving a communication from the UE after receiving the WUS (block 530). For example, the base station (e.g., using communication manager 150 and/or reception component 702 depicted in FIG. 7) may receive a communication from the UE after receiving the WUS, as described above.

Process 500 may include additional aspects, such as any single aspect or any combination of aspects described below and/or in connection with one or more other processes described elsewhere herein.

In a first aspect, the base station is configured to provide a coverage cell.

In a second aspect, alone or in combination with the first aspect, the base station is configured to provide a capacity boosting cell.

In a third aspect, alone or in combination with one or more of the first and second aspects, the WUS occasion corresponds to an SSB.

In a fourth aspect, alone or in combination with one or more of the first through third aspects, the WUS occasion corresponds to multiple SSBs.

In a fifth aspect, alone or in combination with one or more of the first through fourth aspects, the WUS occasion is one of multiple WUS occasions that correspond to an SSB.

In a sixth aspect, alone or in combination with one or more of the first through fifth aspects, the WUS is a dedicated message or preamble of a RACH procedure.

In a seventh aspect, alone or in combination with one or more of the first through sixth aspects, the communication after the WUS is a Msg1 or MsgA of the RACH procedure.

In an eighth aspect, alone or in combination with one or more of the first through seventh aspects, the WUS is an SRS or a PUCCH communication.

In a ninth aspect, alone or in combination with one or more of the first through eighth aspects, process 500 includes transmitting an indication of a numerology of the WUS or of WUS occasions.

In a tenth aspect, alone or in combination with one or more of the first through ninth aspects, process 500 includes transmitting a confirmation message in response to receiving the WUS.

In an eleventh aspect, alone or in combination with one or more of the first through tenth aspects, the confirmation message is DCI that schedules a paging PDSCH, a paging message carried in the PDSCH, a PEI, a reference signal, or a message on a designated channel.

In a twelfth aspect, alone or in combination with one or more of the first through eleventh aspects, the WUS includes a request for PRACH message repetition.

In a thirteenth aspect, alone or in combination with one or more of the first through twelfth aspects, the WUS indicates a UE capability for supporting PRACH message repetition.

In a fourteenth aspect, alone or in combination with one or more of the first through thirteenth aspects, process 500 includes transmitting an indication of a power offset between a transmit power for the communication and a transmit power for the WUS.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
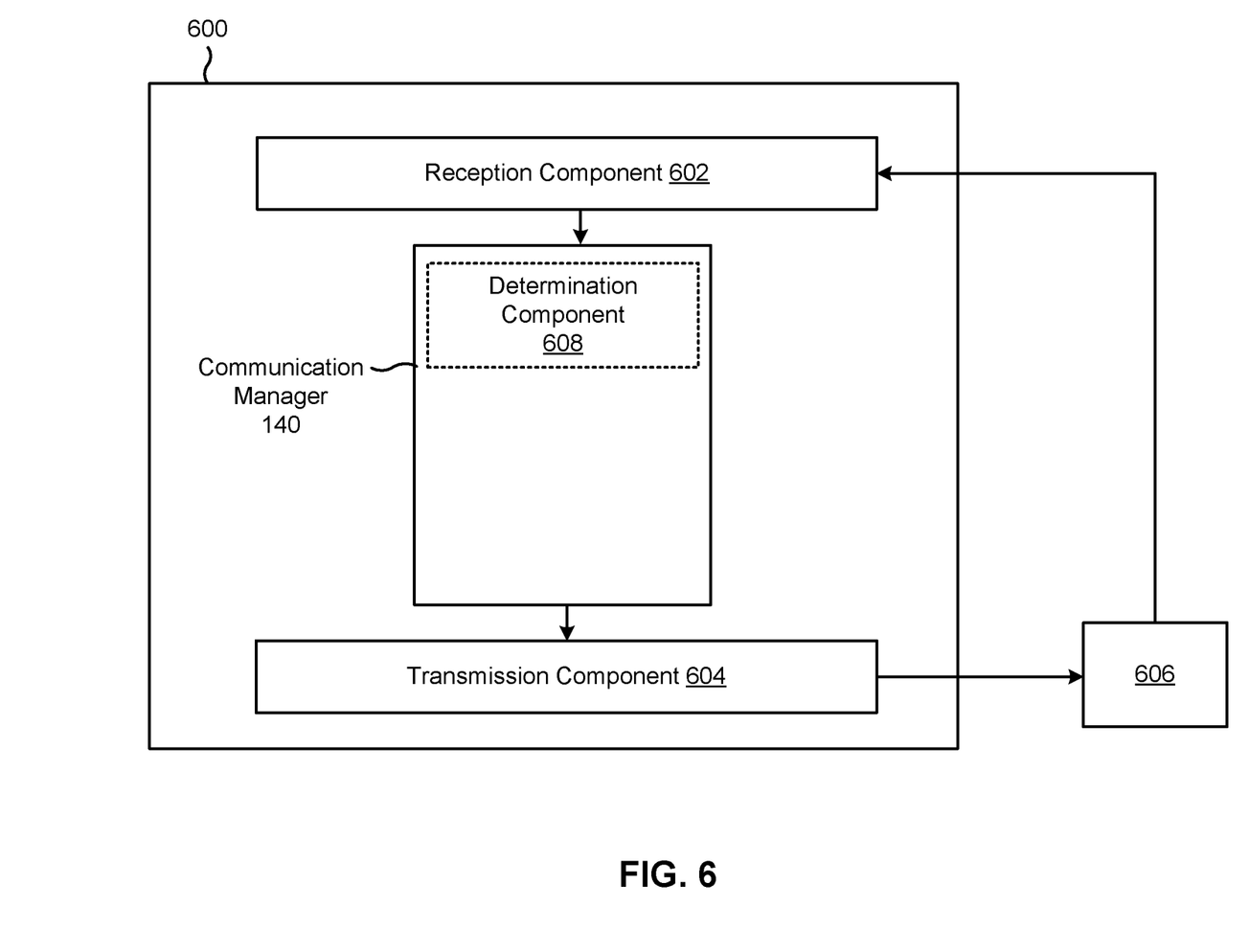
FIGS. 6-7 are diagrams of example apparatuses for wireless communication, in accordance with the present disclosure.

FIG. 6 is a diagram of an example apparatus 600 for wireless communication. The apparatus 600 may be a UE (e.g., a UE 120), or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include the communication manager 140. The communication manager 140 may include a determination component 608, among other examples.

In some aspects, the apparatus 600 may be configured to perform one or more operations described herein in connection with FIGS. 1-3. Additionally, or alternatively, the apparatus 600 may be configured to perform one or more processes described herein, such as process 400 of FIG. 4. In some aspects, the apparatus 600 and/or one or more components shown in FIG. 6 may include one or more components of the UE described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a modem, a demodulator, a MIMO detector, a receive processor, a controller/processor, a memory, or a combination thereof, of the UE described in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modem, a modulator, a transmit MIMO processor, a transmit processor, a controller/processor, a memory, or a combination thereof, of the UE described in connection with FIG. 2. In some aspects, the transmission component 604 may be co-located with the reception component 602 in a transceiver.

The determination component 608 may determine to wake up a base station. The transmission component 604 may transmit a WUS to the base station in a WUS occasion that is configured for the WUS. The transmission component 604 may transmit a communication to the base station after transmitting the WUS.

The reception component 602 may obtain an indication of a numerology of the WUS or of WUS occasions from the base station or from stored configuration information. The reception component 602 may receive a confirmation message in response to transmitting the WUS.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
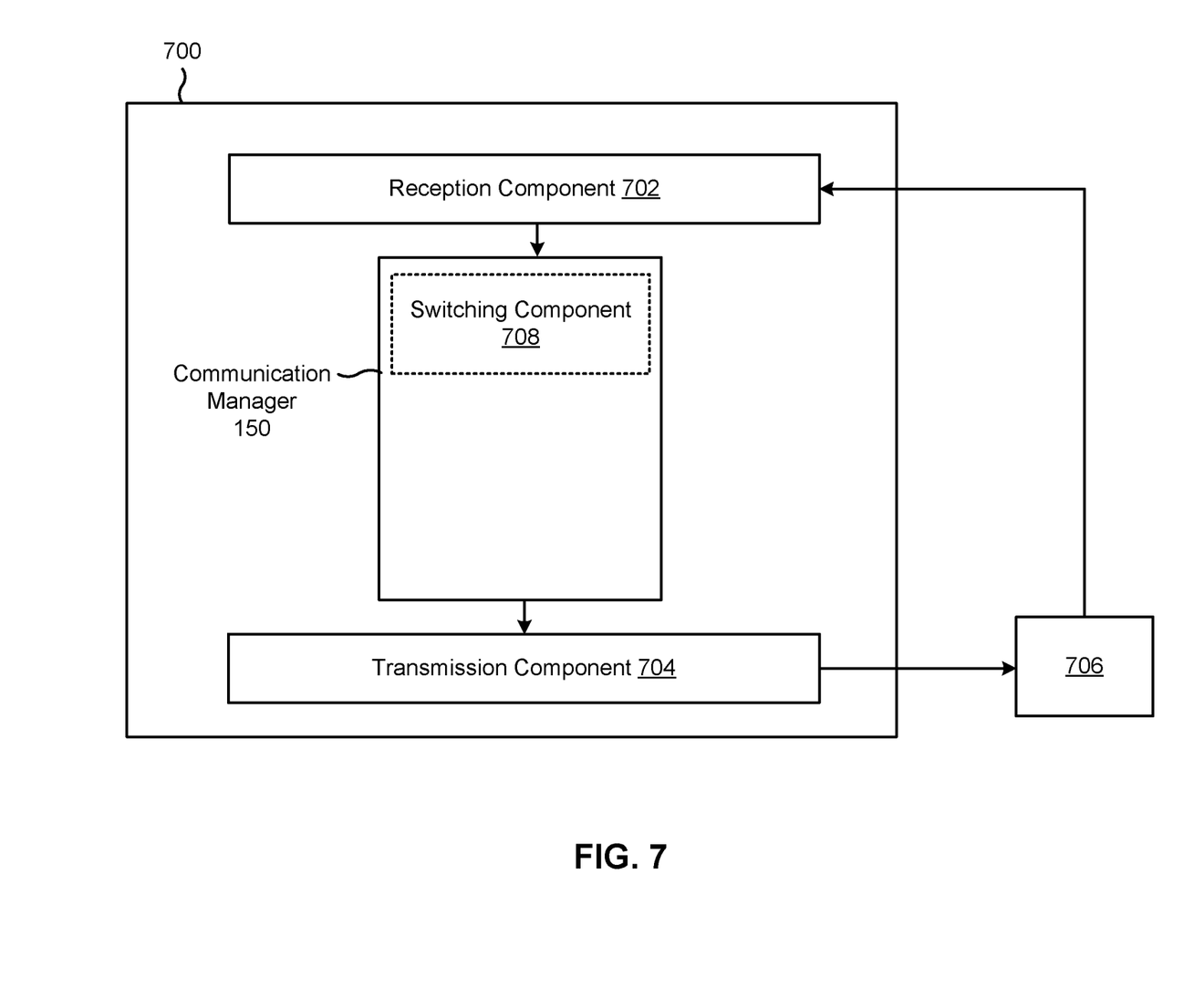

FIG. 7 is a diagram of an example apparatus 700 for wireless communication. The apparatus 700 may be a base station (e.g., base station 110), or a base station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 150. The communication manager 150 may include a switching component 708, among other examples.

In some aspects, the apparatus 700 may be configured to perform one or more operations described herein in connection with FIGS. 1-3. Additionally, or alternatively, the apparatus 700 may be configured to perform one or more processes described herein, such as process 500 of FIG. 5. In some aspects, the apparatus 700 and/or one or more components shown in FIG. 7 may include one or more components of the base station described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a modem, a demodulator, a MIMO detector, a receive processor, a controller/processor, a memory, or a combination thereof, of the base station described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the base station described in connection with FIG. 2. In some aspects, the transmission component 704 may be co-located with the reception component 702 in a transceiver.

The reception component 702 may receive, from a UE while in a dormant mode, a WUS in a WUS occasion that is configured for the WUS. The switching component 708 may enter an active mode from the dormant mode based at least in part on receiving the WUS. The reception component 702 may receive a communication from the UE after receiving the WUS.

The transmission component 704 may transmit an indication of a numerology of the WUS or of WUS occasions. The transmission component 704 may transmit a confirmation message in response to receiving the WUS. The transmission component 704 may transmit an indication of a power offset between a transmit power for the communication and a transmit power for the WUS.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: transmitting a wake up signal (WUS) to a base station in a WUS occasion that is configured for the WUS; and transmitting a communication to the base station after transmitting the WUS.

Aspect 2: The method of Aspect 1, wherein the WUS occasion corresponds to a synchronization signal block.

Aspect 3: The method of Aspect 1, wherein the WUS occasion corresponds to multiple synchronization signal blocks.

Aspect 4: The method of Aspect 1, wherein the WUS occasion is one of multiple WUS occasions that correspond to a synchronization signal block.

Aspect 5: The method of any of Aspects 1-4, wherein the WUS is a dedicated message or preamble of a random access channel (RACH) procedure.

Aspect 6: The method of Aspect 5, wherein the communication after the WUS is a Msg1 or MsgA of the RACH procedure.

Aspect 7: The method of any of Aspects 1-4, wherein the WUS is a sounding reference signal or a physical uplink control channel communication.

Aspect 8: The method of any of Aspects 1-7, further comprising obtaining an indication of a numerology of the WUS or of WUS occasions from the base station or from stored configuration information.

Aspect 9: The method of any of Aspects 1-8, further comprising receiving a confirmation message in response to transmitting the WUS.

Aspect 10: The method of Aspect 9, wherein the confirmation message is downlink control information that schedules a paging physical downlink shared channel (PDSCH), a paging message carried in the PDSCH, a paging early indication, a reference signal, or a message on a designated channel.

Aspect 11: The method of any of Aspects 1-10, wherein the WUS includes a request for physical random access channel (PRACH) message repetition.

Aspect 12: The method of Aspect 11, wherein the WUS includes the request for PRACH message repetition if a signal strength of a corresponding synchronization signal block satisfies a signal threshold or if a power class of the UE satisfies a power class threshold.

Aspect 13: The method of any of Aspects 1-12, wherein the WUS indicates a UE capability for supporting physical random access channel message repetition.

Aspect 14: The method of any of Aspects 1-13, wherein a transmit power for the communication is based at least in part on a transmit power for the WUS.

Aspect 15: The method of Aspect 14, wherein the transmit power for the communication is further based at least in part on a power offset between the transmit power for the communication and the transmit power for the WUS.

Aspect 16: A method of wireless communication performed by a base station, comprising: receiving, from a user equipment (UE) while in a dormant mode, a wake up signal (WUS) in a WUS occasion that is configured for the WUS; entering an active mode from the dormant mode based at least in part on receiving the WUS; and receiving a communication from the UE after receiving the WUS.

Aspect 17: The method of Aspect 16, wherein the base station is configured to provide a coverage cell.

Aspect 18: The method of Aspect 16, wherein the base station is configured to provide a capacity boosting cell.

Aspect 19: The method of any of Aspects 16-18, wherein the WUS occasion corresponds to a synchronization signal block.

Aspect 20: The method of any of Aspects 16-18, wherein the WUS occasion corresponds to multiple synchronization signal blocks.

Aspect 21: The method of any of Aspects 16-18, wherein the WUS occasion is one of multiple WUS occasions that correspond to a synchronization signal block.

Aspect 22: The method of any of Aspects 16-21, wherein the WUS is a dedicated message or preamble of a random access channel (RACH) procedure.

Aspect 23: The method of Aspect 22, wherein the communication after the WUS is a Msg1 or MsgA of the RACH procedure.

Aspect 24: The method of any of Aspects 16-21, wherein the WUS is a sounding reference signal or a physical uplink control channel communication.

Aspect 25: The method of any of Aspects 16-24, further comprising transmitting an indication of a numerology of the WUS or of WUS occasions.

Aspect 26: The method of any of Aspects 16-25, further comprising transmitting a confirmation message in response to receiving the WUS.

Aspect 27: The method of Aspect 26, wherein the confirmation message is downlink control information that schedules a paging physical downlink shared channel (PDSCH), a paging message carried in the PDSCH, a paging early indication, a reference signal, or a message on a designated channel.

Aspect 28: The method of any of Aspects 16-27, wherein the WUS includes a request for physical random access channel (PRACH) message repetition.

Aspect 29: The method of any of Aspects 16-28, wherein the WUS indicates a UE capability for supporting physical random access channel message repetition.

Aspect 30: The method of any of Aspects 16-29, further comprising transmitting an indication of a power offset between a transmit power for the communication and a transmit power for the WUS.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      transmit a wake up signal (WUS) to a base station in a WUS occasion that is configured for the WUS; and
      transmit a communication to the base station after transmitting the WUS,
      wherein the WUS includes a request for physical random access channel (PRACH) message repetition transmission from the UE.

2. The UE of claim 1, wherein the WUS occasion corresponds to a synchronization signal block.

3. The UE of claim 1, wherein the WUS occasion corresponds to multiple synchronization signal blocks.

4. The UE of claim 1, wherein the WUS occasion is one of multiple WUS occasions that correspond to a synchronization signal block.

5. The UE of claim 1, wherein the WUS is a dedicated message or preamble of a random access channel (RACH) procedure.

6. The UE of claim 5, wherein the communication after the WUS is a Msg1 or MsgA of the RACH procedure.

7. The UE of claim 1, wherein the WUS is a sounding reference signal or a physical uplink control channel communication.

8. The UE of claim 1, wherein the one or more processors are configured to obtain an indication of a numerology of the WUS or of WUS occasions from the base station or from stored configuration information.

9. The UE of claim 1, wherein the one or more processors are configured to receive a confirmation message in response to transmitting the WUS.

10. The UE of claim 9, wherein the confirmation message is downlink control information that schedules a paging physical downlink shared channel (PDSCH), a paging message carried in the PDSCH, a paging early indication, a reference signal, or a message on a designated channel.

11. The UE of claim 1, wherein the WUS includes the request for PRACH message repetition if a signal strength of a corresponding synchronization signal block satisfies a signal threshold or if a power class of the UE satisfies a power class threshold.

12. The UE of claim 1, wherein the WUS indicates a UE capability for supporting PRACH message repetition.

13. The UE of claim 1, wherein a transmit power for the communication is based at least in part on a transmit power for the WUS.

14. The UE of claim 13, wherein the transmit power for the communication is further based at least in part on a power offset between the transmit power for the communication and the transmit power for the WUS.

15. A base station for wireless communication, comprising:
   one or more memories; and
   one or more processors, coupled to the one or more memories, configured to:
      receive, from a user equipment (UE) while in a dormant mode, a wake up signal (WUS) in a WUS occasion that is configured for the WUS,
      wherein the WUS includes a request for physical random access channel (PRACH) message repetition transmission from the UE;
      enter an active mode from the dormant mode based at least in part on receiving the WUS; and
      receive a communication from the UE after receiving the WUS.

16. The base station of claim 15, wherein the base station is configured to provide a coverage cell.

17. The base station of claim 15, wherein the base station is configured to provide a capacity boosting cell.

18. The base station of claim 15, wherein the WUS occasion corresponds to a synchronization signal block.

19. The base station of claim 15, wherein the WUS occasion corresponds to multiple synchronization signal blocks.

20. The base station of claim 15, wherein the WUS occasion is one of multiple WUS occasions that correspond to a synchronization signal block.

21. The base station of claim 15, wherein the WUS is a dedicated message or preamble of a random access channel (RACH) procedure.

22. The base station of claim 21, wherein the communication after the WUS is a Msg1 or MsgA of the RACH procedure.

23. The base station of claim 15, wherein the WUS is a sounding reference signal or a physical uplink control channel communication.

24. The base station of claim 15, wherein the one or more processors are configured to transmit an indication of a numerology of the WUS or of WUS occasions.

25. The base station of claim 15, wherein the one or more processors are configured to transmit a confirmation message in response to receiving the WUS.

26. The base station of claim 25, wherein the confirmation message is downlink control information that schedules a paging physical downlink shared channel (PDSCH), a paging message carried in the PDSCH, a paging early indication, a reference signal, or a message on a designated channel.

27. The base station of claim 15, wherein the WUS indicates a UE capability for supporting PRACH message repetition.

28. The base station of claim 15, wherein the one or more processors are configured to transmit an indication of a power offset between a transmit power for the communication and a transmit power for the WUS.

* * * * *